United States Patent [19]

Carlson

[11] 4,008,365
[45] Feb. 15, 1977

[54] BUS TRAY ELECTRICAL DISTRIBUTION SYSTEM

[75] Inventor: Elmer T. Carlson, Granby, Conn.

[73] Assignee: Broadhill Development Corporation, Plainville, Conn.

[22] Filed: Mar. 3, 1975

[21] Appl. No.: 554,684

[52] U.S. Cl. .................... 174/68 B; 174/72 B; 174/88 B; 339/22 B
[51] Int. Cl.² ........................ H02G 5/06
[58] Field of Search ............. 174/99 B, 88 B, 68 B, 174/16 B, 101, 72 B, 71 B, 70 B, 100; 339/22 B; 307/147

[56] References Cited

UNITED STATES PATENTS

| | | | |
|---|---|---|---|
| 3,614,297 | 10/1971 | Carlson | 174/68 B X |
| 3,770,875 | 11/1973 | Carlson | 174/68 B X |
| 3,803,343 | 4/1974 | Carlson | 174/68 B X |

*Primary Examiner*—Laramie E. Askin
*Attorney, Agent, or Firm*—Jackson, Jackson & Chovanes

[57] ABSTRACT

The invention relates to single, paired opposite phased and multiple stacked insulated flexible or rigid bus bar electrical conductors of copper or aluminum assembled side by side (optionally in a factory or at installation site) as high current density circuits into open trays of substantial length and covers to totally enclose a heat transfer tray co-extensive with the tray and having clamps extending across the tray to secure the cover to the tray and urging the cover upon conductors or conductor joints in the tray by tightening single bolts per clamp. Also, the invention involves making externally operable end to end overlap compression circuit joints of bus bar conductors simultaneously with one or more single bolt clamps for each single, paired phase and multiple stack, electrically insulated apart and supported within the metal tray. Another embodiment consists of insulated bus bar conductors assembled as paired phase circuits into bus tray having one conductor of each paired phase bared, folded and extended into protected access at spaced intervals for engagement of plug-in and bolted branch circuit loads.

7 Claims, 21 Drawing Figures

BUS TRAY ELECTRICAL DISTRIBUTION SYSTEM

DISCLOSURE OF INVENTION

In my U.S. Pat. No. 3,504,097 I describe how both round and flat-shaped insulated conductors will carry more current in an electrical circuit by assembly within a metal tray in a manner to effect rapid heat transfer of line losses to surrounding air. I have learned by tests that a higher rate of heat transfer is obtained in my bus tray design by solid rectangular bus bars than by round stranded concentric lay wires. I further learned that assembled conductor ampacity could be significantly increased by placing flat conductors and circuit joints of an A.C. circuit in intimate and opposite phase relationship to each other and to the tray enclosure. This selection of two bi-laminated bus bars per phase increases the conductor heat transfer contact area, reduces the heat gradient distance and lowers heat losses due to line reactance and joint resistance. Due to lower circuit reactance of the paired phase bus bars, voltage drop is reduced to a minimum. The division of high fault currents in paired phase circuit reduces mechanical stresses and improves system reliability.

Neutral conductors of three-phase, four-wire circuits divided into three bus bars may be sandwiched between the opposite and paired phases and maintain balanced voltage of the circuit line to neutral without transpositions as is required in ordinary busways.

My invention is a total electrical distribution system which provides improved and lower cost power feeder transmission functions achieved by an assembly of components of my bus tray system. Busway system feeder products for electrical distribution systems ordinarily consist exclusively of factory assemblies of bus bar circuits into straight section lengths and fittings for field joining together into runs. Bus tray may be optionally delivered to a point of installation factory assembled with conductors (such as busway) or may consist of an open tray and fittings field joined into a run, into which flexible or rigid bus bars of continuous or partial circuit length are laid in place to be enclosed and bolt-compressed by covers having attached clamps of special design. Further the bus tray installation may consist of runs having portions with conductors optionally factory and field assembled.

In a run bus tray fittings are provided to terminate the circuit, make turns, joint conductors and attach branch circuits. Bus tray installation planning allows circuits of none or relatively few joints between run terminals. Bus bar conductors are solid or laminations of solid ductile copper and aluminum insulated as single or plurality of conductors per phase. A common denominator width may be selected for bus bars and the thickness and number of metal laminations varied to obtain desired assembled circuit ampacities. The bus tray cover clamp adjusts to provide compression to varying thickness bus bars, and varying number of stacked bus bars of a circuit, thereby making it possible to interchangeably field assemble copper or aluminum circuits in a wide range of ampacities in a single size tray. Representative range of bus tray circuit ampacities in a single tray would be 400-600-800 and 1200. It should be noted that these ampacities are for bus tray circuit assemblies as marked on the tray and do not apply to unassembled bus bar conductors. Since bus tray circuits of equal ampacity and length have matched impedance, parallel circuits may be connected as runs to obtain increased ampacities such as 1600-2400-3600 and 4800.

The efficient compact bus bar circuit allows the selection of a bus tray of small dimension and light weight to take less building space and allow easy installation. The cover clamp performs simultaneously functions of attaching the cover to the tray and moving the cover into compression of enclosed bus bars and bus bar joints by the simple tightening of one bolt.

In buildings vertically assembled bus bars are clamped within the bus tray run and are inherently provided with required circuit weight support.

The cover clamp design lowers the manufacturing cost of bus tray and reduces field assembly time as compared with the numerous cover assembly nuts and bolts that were employed in the cable bus of my U.S. Pat. No. 3,803,343. The ease of installing and removing the bus tray covers allows for flexibility and low cost interchange of a wide range of conductor ampacities in existing bus tray installations to meet increased power needs without disturbing the run tray installation.

Unique to a bus tray run is the clamp provision to join simultaneously all totally enclosed circuit bus bar conductors within a tray or fitting. My invention includes such a fitting to effectively maintain heat transfer from the joint assembly, safe insulation, substantial mechanical support of terminals and easy access of joining and enclosing the bus bars employing one or more single bolt clamps for each single, paired phase or stacked three phase multiple grouping of circuit conductors which could also include a neutral between paired phases.

Bus tray runs in some applications are tapped with circuits to branch loads and I provide a suitable bus bar connector for assembly into a bus tray having an attached enclosure to contain bare conductor protrusions suitably spaced and insulator supported for attachment of branch circuit conductor and protective devices by bolt or "clip-on" fastening.

This bus tray invention relates to an electrical distribution system comprising physical and electrical matching components consisting of a covered tray, flexible single, paired phase and three-phase stacked circuits of bus bar conductors, bus bar joints, and various circuit fittings for job site assembly in buildings (interchangeably) as high ampacity feeders in radial or tree layout that perform in compliance with pre-tested circuit ampacities as marked on the run tray components.

A basic purpose is to make open elongated trays for job site lay-in of extended electrical conductors to be totally enclosed and compressed by secured covers retained by single bolt clamps to the tray, in a manner to allow rapid installation, removal or replacement of conductors.

In a connector box to join one section to another, or in trays of a run, advantage is taken to balance system voltage drop and at the same time join the cables under pressure.

A further purpose is to employ ductile aluminum and copper insulated conductors of one or laminations of bus bars of equal interchangeable size and cross sections for assembly as circuit conductors relatively thin in relation to width to achieve edgewise bending flexibility required for continuous length production and reeling.

A further purpose is to adhere the wide surface of single bus bars per phase circuit conductors and two bus bars insulated conductors of equal cross section into opposite paired phase legs of multiphase alternating current circuits interchangeable in the same size tray.

A further purpose is to gain increased area of heat transfer contact of one or two stacked thin bus bars per circuit phase and to assure a short distance heat transfer gradient.

A further purpose is to reduce heat of line losses by lowering circuit impedence by close spacing of opposite phase bus bars and dividing phase conductors.

A further purpose is to reduce short circuit mechanical stresses by a division of line current.

A further purpose is to provide dimensional interchangeability of single phase, three-phase and three-phase four-wire solid neutral circuits of single, paired phase and stacked bus bar to total varying thicknesses of equal width in a single bus tray.

A further purpose is to save material cost and installation time.

A further purpose is to minimize tray size to minimize use of building space.

Another purpose is to reduce the weight of aluminum, copper and steel required for electrical distribution by reducing line reactance and efficient heat transfer from the tray to the surrounding air.

Another purpose is to eliminate or minimize the number of conductor joints in a feeder circuit.

A further purpose is to provide in runs a total metal enclosure of low resistance overlap joints of paired and stacked bus bar circuit conductors which are electrically insulated apart, rigidly supported and compressed between insulation panels by covers with one or more single bolt clamps.

A further purpose is to provide a minimum variety of tray dimensions and bus bar conductors that can be interchangeably used to assemble a wide range of feeder circuit ampacities in radial or tree system arrangements.

A further purpose is to employ a single bolt clamped overlap joint for the electrical connection of all functional fittings into the bus tray system.

A further purpose is to provide a tray having spaced openings, each enclosed with a box, with provisions to extend branch circuits by direct attachment of conduit and wire or disconnect protective devices having "plug-in" or lug tap provisions.

A further purpose is to provide a single or paired phase bus bar conductor having folded bared conductor protrusions spaced in a circuit in staggered relationship to coincide with insulated openings of the tray and box enclosure in suitable length to permit bolt-on or plug-in engagement for a branch circuit extension.

In the drawings I insert an exemplified showing of the invention.

Figure 14:
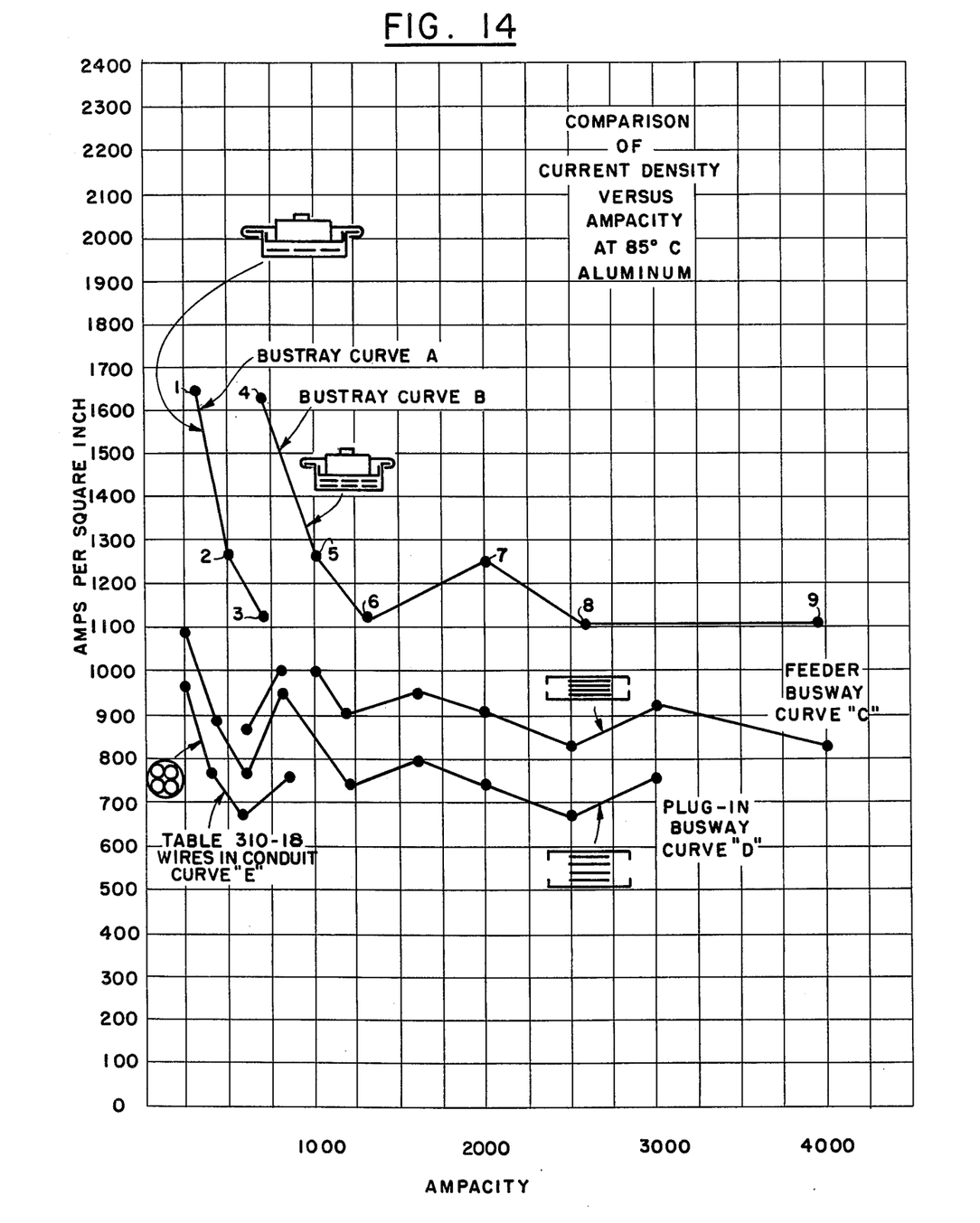
FIG. 14 is a series of curves comparing current densities of Bus Tray Cablebus, Busways and Wires in Conduit at various ampacities according to provisions of The National Electrical Code (1975 Edition).

FIG. 14 illustrates the potential economy of aluminum conductors as high capacity feeders at a low voltage such as 600 volt electrical distribution systems in industrial and commercial buildings having totally enclosed ampacities according to the "Cablebus" article 365 of The National Electrical Code and Table 365-19, 85° C. temperature rating which is part of that article.

Curve A shows current density of single 250, 500 and 750 MCM insulated aluminum conductors of the bus tray consisting of assemblies of aluminum strips. Each strip equals 250,000 circular mills. The respective ampacities according to The National Electrical Code Table 310-19 are 330, 515 and 670 as three-phase circuit assemblies of totally enclosed bus trays.

Curve B shows the current density of conductors described above as paired opposite phase, three-phase circuit assemblies of 500, 1000 and 1,500 MCM having ampacities 660, 1030 and 1340 respectively in a single tray. Higher ampacity circuits consist of parallelling matched impedance circuits, for example of 2060, 2680 and 4020 as plotted.

Curve C shows current density of feeder bus tray of heat transfer design having a compressed stack of insulated bus bars and ampacities rated as 85° C. temperature rating.

Curve D shows current density of plug-in busway having air space stack of insulated bus bars and ampacity rated 85° C. temperature.

Curve E shows current density of aluminum conductors in conduit and enclosed raceways according to National Electrical Code Table 310-18.

Insulated copper conductors, in assemblies of equal size are interchangeable in trays and fittings with aluminum conductors.

Table I shows the data curves A and B and also like data of equal cross section copper conductors.

TABLE I

| Fig. 14 No. | Table 310-19 MCM | 85° C. AMP. | ALUMINUM No. Cond. per phase | Circ't. MCM | Circ't. AMP. | Sq.in. per circ't. phase | Amps per sq.in. |
|---|---|---|---|---|---|---|---|
| 1 | 250 | 330 | 1 | 250 | 330 | .2 | 1650 |
| 2 | 500 | 515 | 1 | 500 | 515 | .4 | 1288 |
| 3 | 750 | 670 | 1 | 750 | 670 | .6 | 1117 |
| 4 | 250 | 330 | 2 | 500 | 660 | .4 | 1650 |
| 5 | 500 | 515 | 2 | 1000 | 1030 | .8 | 1288 |
| 6 | 750 | 670 | 2 | 1500 | 1340 | 1.2 | 1117 |
| 7 | 500 | 515 | 4 | 2000 | 2060 | 1.6 | 1288 |
| 8 | 750 | 670 | 4 | 3000 | 2680 | 2.4 | 1117 |
| 9 | 750 | 670 | 6 | 4000 | 4020 | 3.6 | 1117 |
| | 310-17 | | COPPER | | | | |
| 1 | 250 | 425 | 1 | 250 | 425 | .2 | 2125 |
| 2 | 500 | 660 | 1 | 500 | 660 | .4 | 1650 |
| 3 | 750 | 845 | 1 | 750 | 845 | .6 | 1408 |
| 4 | 250 | 425 | 2 | 500 | 850 | .4 | 2125 |
| 5 | 500 | 660 | 2 | 1000 | 1320 | .3 | 1650 |
| 6 | 750 | 845 | 2 | 1500 | 1690 | 1.2 | 1408 |
| 7 | 500 | 660 | 4 | 2000 | 2640 | 1.6 | 1650 |
| 8 | 750 | 845 | 4 | 3000 | 3480 | 2.4 | 1408 |
| 9 | 750 | 845 | 6 | 4000 | 5070 | 3.6 | 1408 |

Thus for a three-phase system the thin bus bars are 30, 31 and 32 and 30', 31' and 32'. The bus bars are covered by insulation 33.

The bus bars are laid in a tray 40 side by side, the tray 40 consisting of a straight portion preferably horizontal 42, two preferably vertical portions 44, two straight portions 46, preferably horizontal.

The trays are joined at each end by flanges 48 connected together by plate retained bolts 50 having nuts 52.

The trays are covered by a cover 60 which has a preferably horizontal portion 62 and two preferably vertical portions 64 so that the cover is a U or channel.

The tray has across it at various intervals clamps 70 consisting of a stationary clamp portion 74 and a movable clamp portion 72.

The stationary clamp has a stiffener channel 80 beneath it although this may be made from one side of the clamp. Each clamp is straddled by a horseshoe member 82 having a base of the U 84, arms of the U 86 and projecting ends 88 which are held to the cover as by spot welding or optionally welding to a separate plate 89.

The base of the U at the center has an opening 90 receiving a bolt 92, and the clamp has a corresponding opening 94 for the bolt which corresponds in position with a captive nut 96 held to the bottom of the stiffener member. Thus the bolt passes through the U and into the captive nut and brings pressure against the cover to tighten the cover on the insulation and the bus bars.

At the ends of the trays, overlapping the joint, I place a separate clamp having plate 89 with an inverted U channel to produce extra strength to the bus tray flanges. At and co-incident with the tray flanges at the end of the cover, where it is connected to another cover, the pressure plate 89 assembles so as to close the joint opening.

Figure 7:
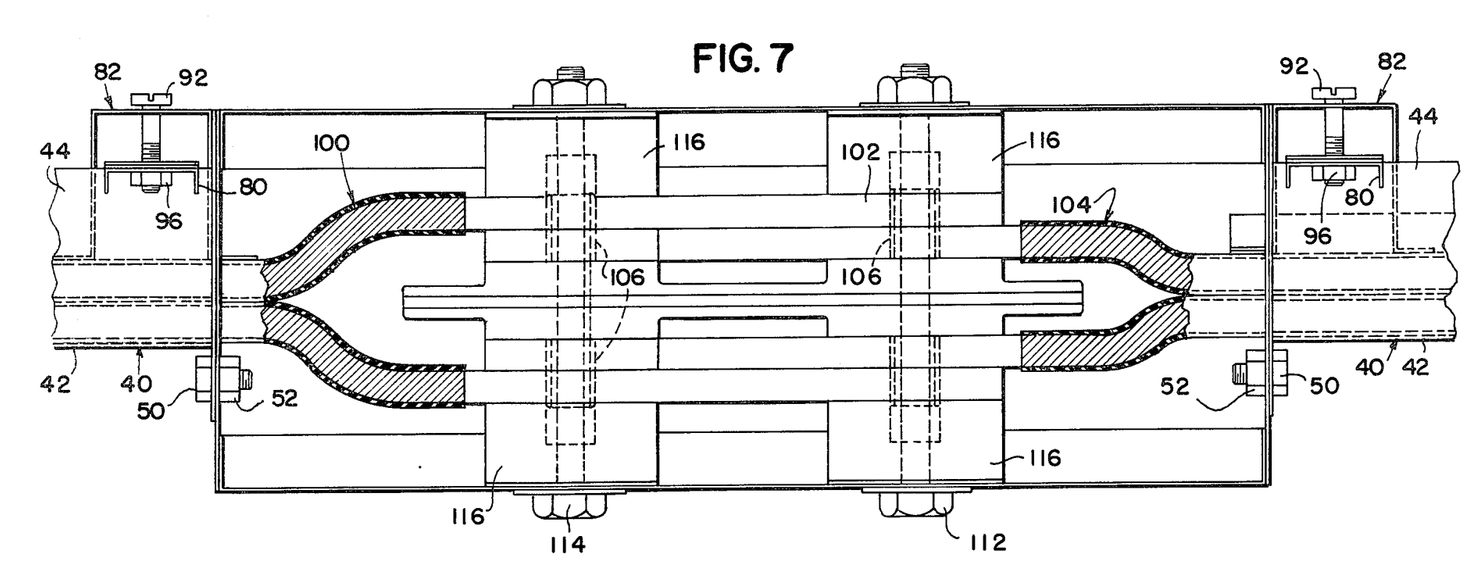
FIG. 7 is a fragmentary section of a circuit phase bolted bus bar joint made in a separate box assembled in a run.

In a tray run, circuits may be joined within boxes wherein the bus bars at the ends 100 and 104 have slots 102 and are capable of receiving mating bus bar slots as shown in FIG. 7. The mated bus bars engage insulation 106 at the inside. It will be understood that the bus bar ends are slotted so that they are capable of mating as shown in FIG. 7. The bus bar ends of circuits as shown in FIGS. 8, 9, 10 and 11 are alternately staggered as illustrated by protruding member 110. The joint has bolts 112 and 114 holding it together, and the bolts are covered by insulation 116 and pass through all of the mated bus bar ends.

Figures 7A, 7B:
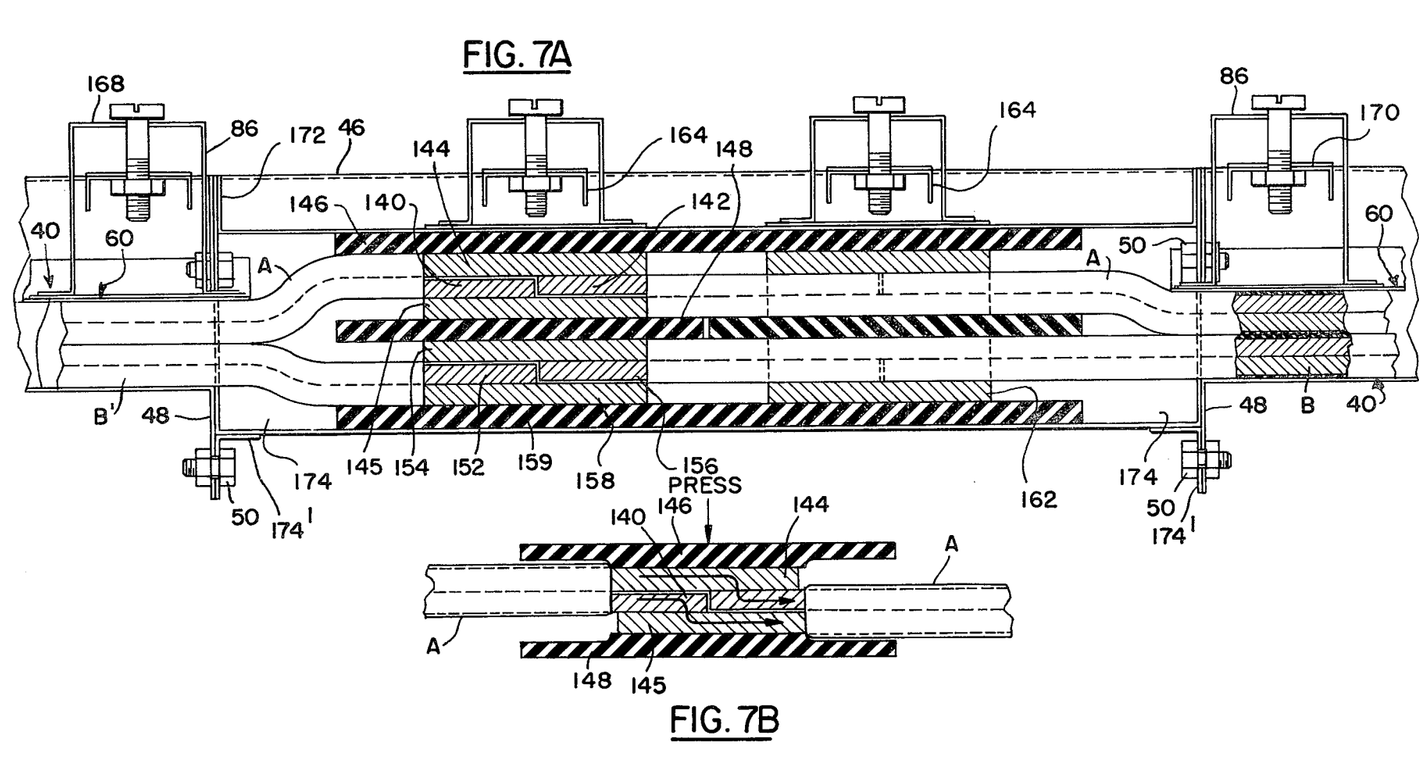
FIG. 7A is a fragmentary section of a circuit bus bar joint employing cover clamps with the section taken on the line 7A—7A of FIG. 7D.
FIG. 7B is a detail of FIG. 7A to show a sandwich bus bar joint.

Although single bolt clamps per phase of FIG. 7 with bolts may be used, I prefer the designs of FIG. 7A in which there is a sandwich of conductor strips to assure low joint resistance by producing large contact area. Another advantage of the sandwich joint forms of conductors is that the total joint height is reduced.

FIGS. 7A to 7E is a preferred form of joining three-phase or three-phase four-wire circuits consisting of single, multiple and paired opposite phase bus bar conductors in a metal box assembled between trays in a run.

FIG. 7B is a detailed showing of the current flow through a single conductor joint that sandwiches one short segment of each joining two segment conductors between extended segments in order to reduce the total joint thickness yet retain a large area for contact purposes.

In FIG. 7A phases C and A' are directly behind this joint in plan view.

Figures 7C, 7D, 7E:
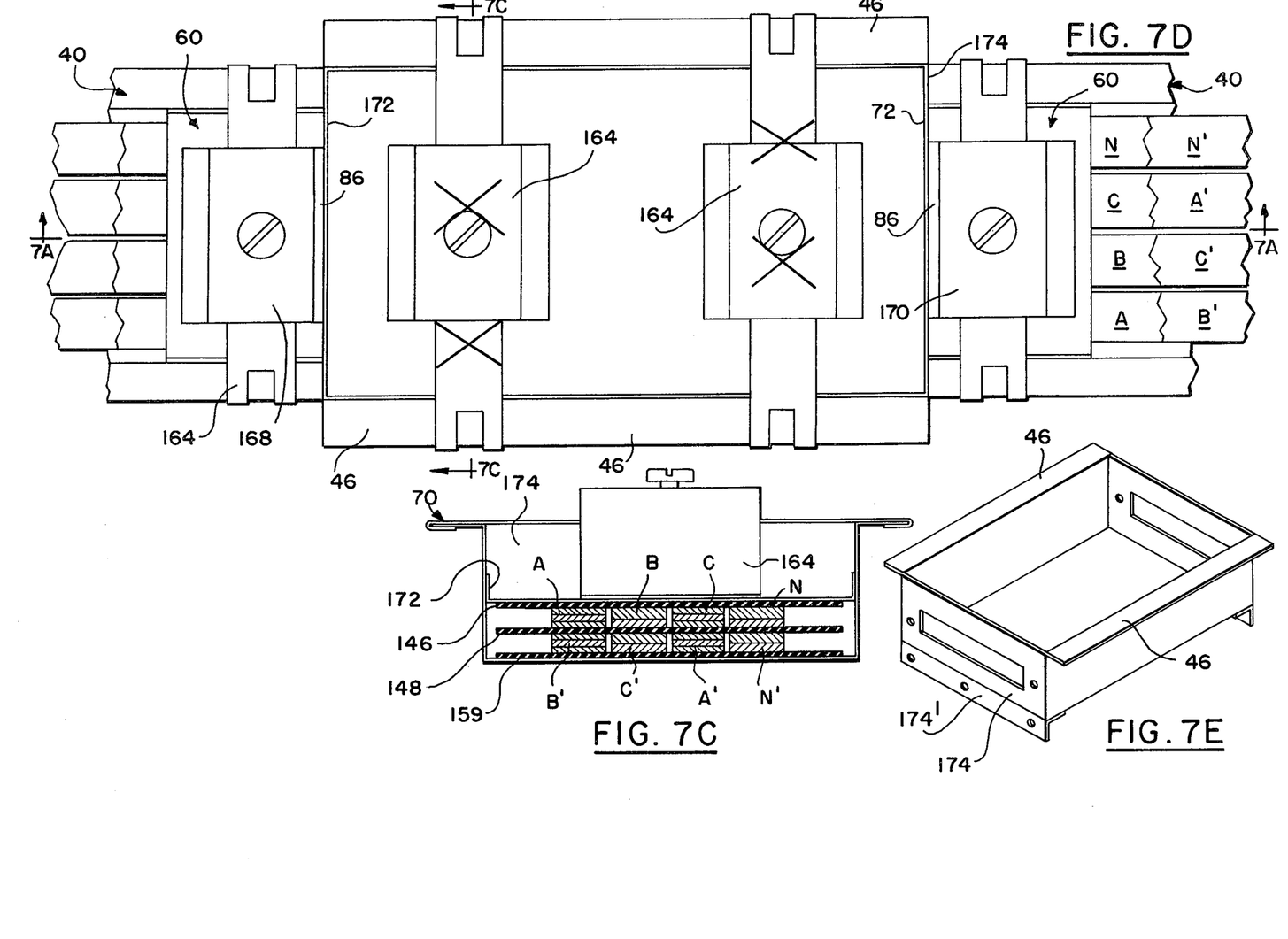
FIG. 7C is a section at the line 7C—7C of FIG. 7D.
FIG. 7D is a plan view of the joint as set out in FIGS. 7A to 7C.
FIG. 7E is a perspective of the joint box.

In FIG. 7C conductors A and B' may be the same or opposite phase.

The joints in the detail of FIG. 7B are shown as to location by the cross marks on FIG. 7D. The two middle clamps in FIG. 7D compress the cover and so compress the joint. The two clamps at the left and right in FIG. 7D compress the tray cover and cables and close the openings in the box end.

In FIG. 7E the ends with the openings have provision to bolt the tray flange.

Entering circuits are illustrated as paired opposite phases held by trays 40 with covers 60 and secured to the flange 174' of box 174 by flanges 48 with bolts 50 and having clamps 168 and 170 to compress the conductors and 86 to close the tray entering openings.

Figure 1:
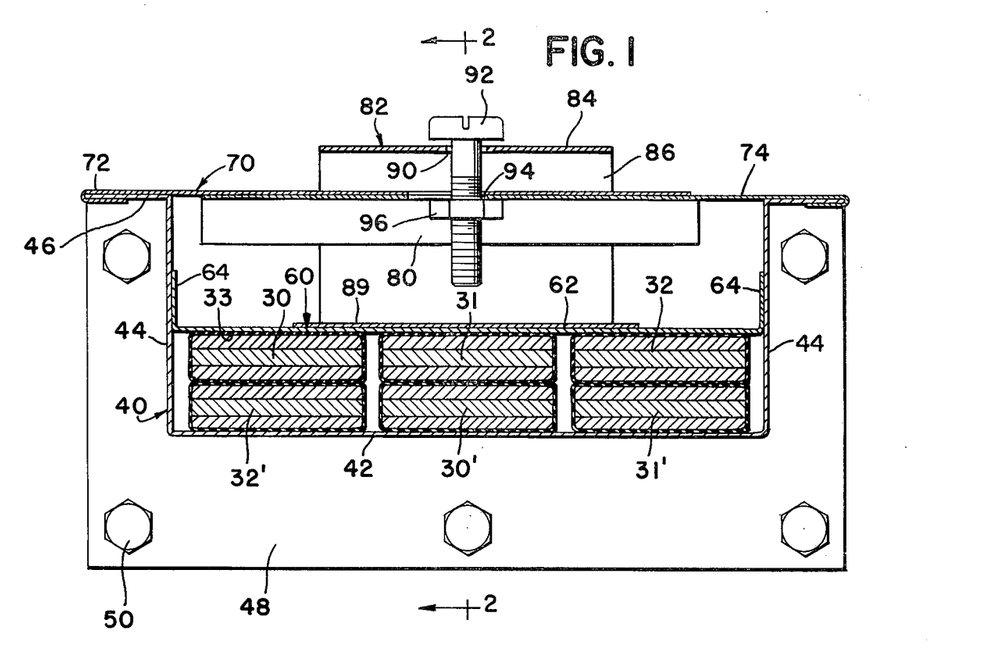
FIG. 1 is a cross section through the tray assembly.
Figure 1A:
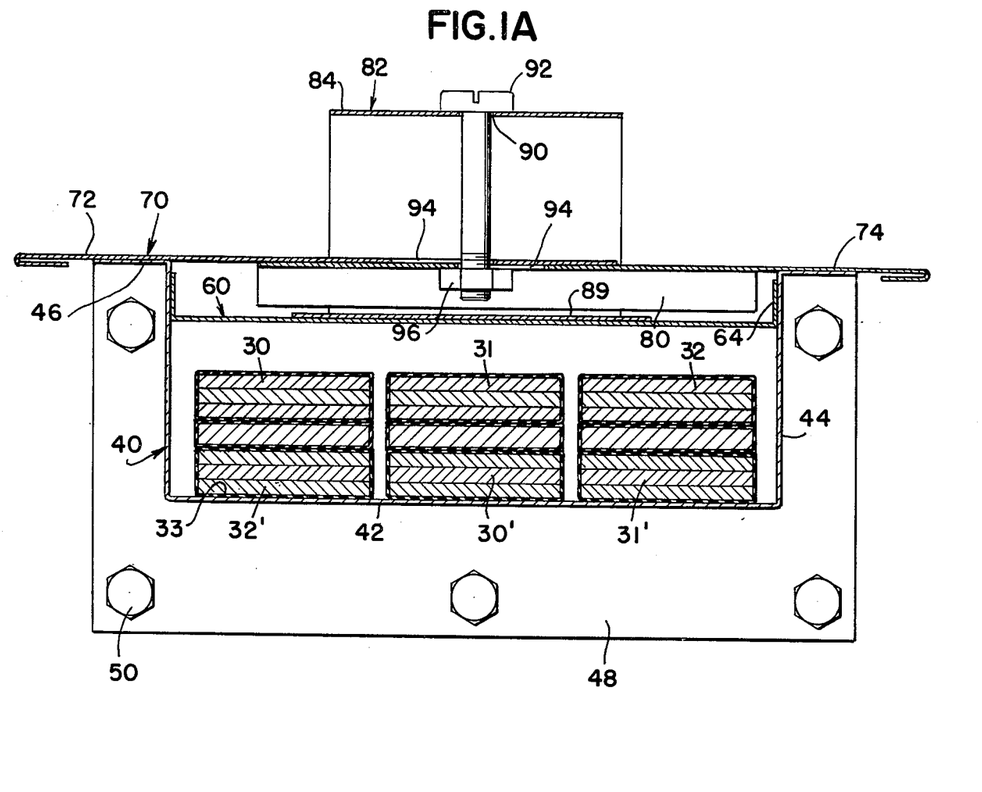
FIG. 1A is a cross section of the tray assembly with the clamp open ready for attachment.
Figure 1B:
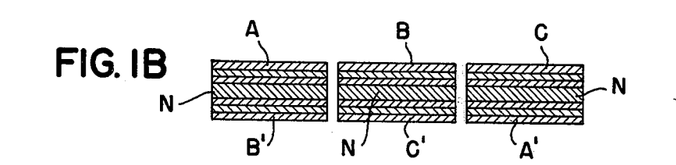
FIG. 1B is a cross section of a paired opposite phase circuit with neutral following FIG. 1A.
Figure 2:
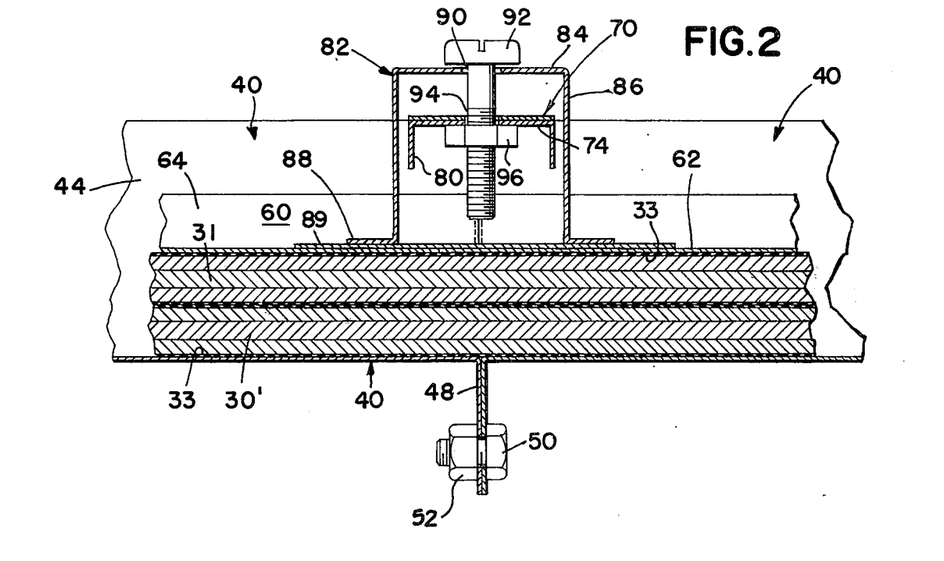
FIG. 2 is a longitudinal section of the tray assembly.
Figure 3:
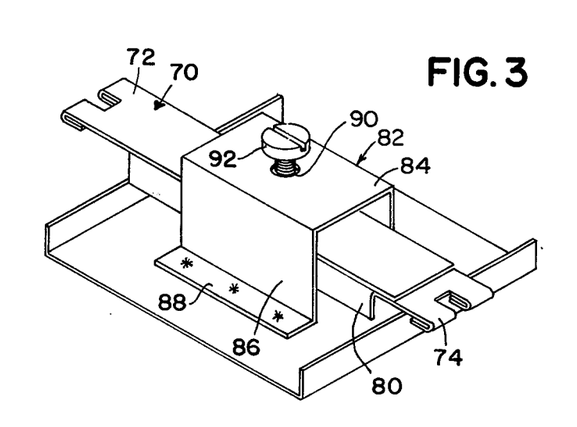
FIG. 3 is a fragmentary sectional perspective of the removable clamp with a compression plate for assembly at joints of sections and fittings of a run.
Figure 4:
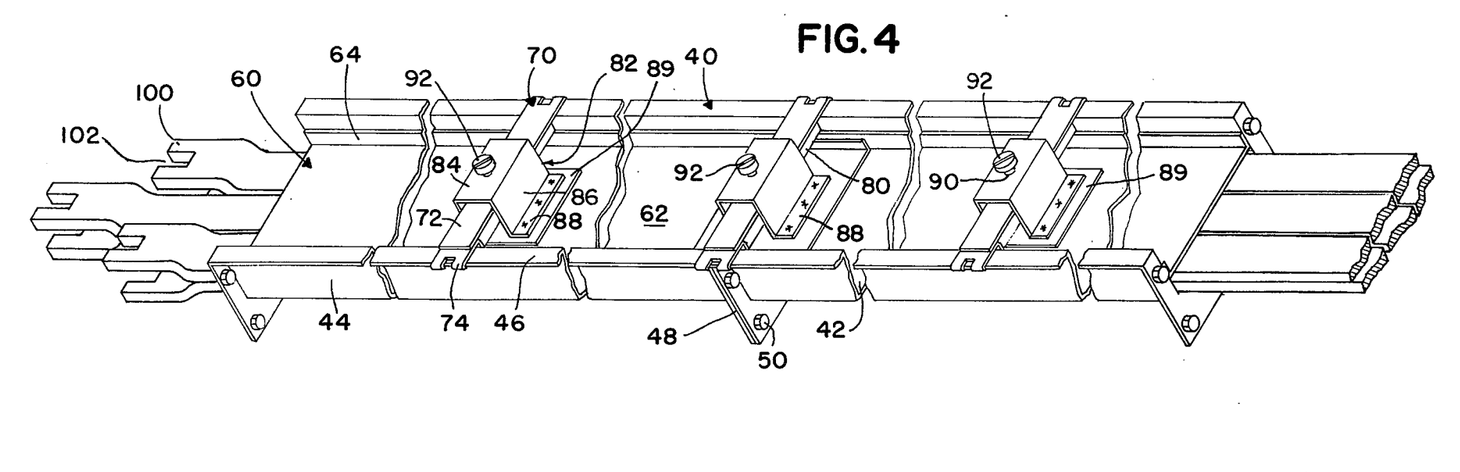
FIG. 4 is a fragmentary perspective of the bus tray with a phase arrangement of a three-phase bus bar circuit.
Figure 5:
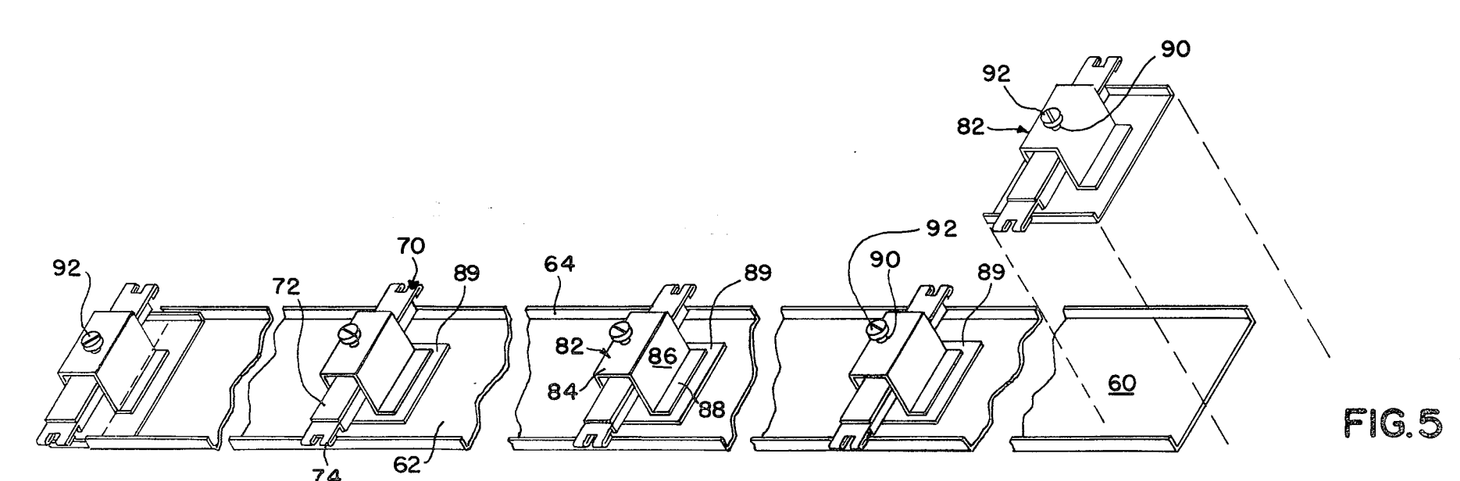
FIG. 5 is a fragmentary perspective of the cover and clamps.
Figure 6:
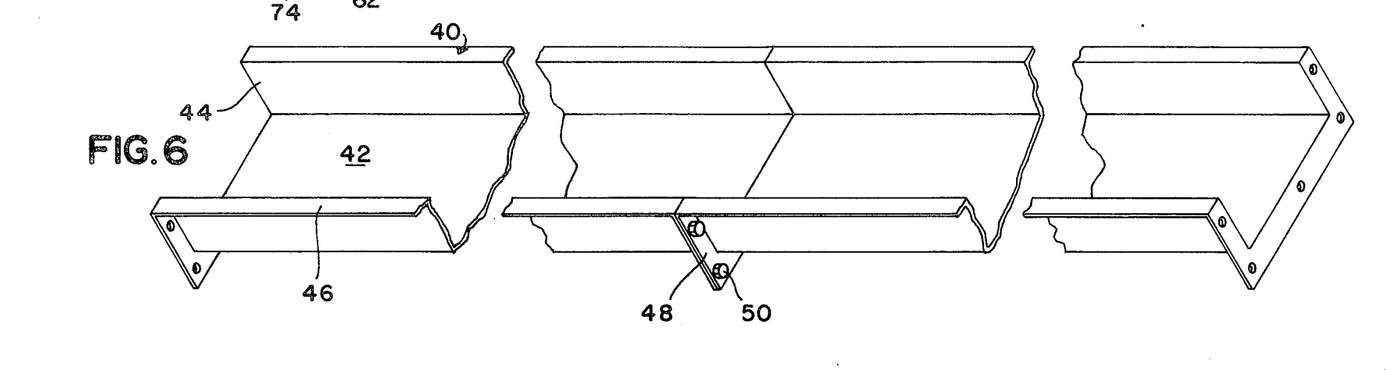
FIG. 6 is a fragmentary perspective of the bus tray.

Joining ends of opposite phased joints are indexed by insulation spacers 159, 148 and 146 into staggered relationship as illustrated in FIGS. 8, 9, 10 and 11 but with slots 102 omitted. All joining strip conductor ends have insulation removed as illustrated in FIG. 7B, and the paired ends terminated in variable length, so that strip end 144 opposes strip end 142, while the joining strip 145 lies against strip 140. Insulation to ground is provided by insulation 146. Phase separation is provided by insulation 148. Likewise in phase B', strip end 154 opposes strip end 156, and strip end 158 lies against strip end 152. Phase B' insulation is provided by insulation 159. Pressure is provided by clamps of FIG. 3 design that engage flanges 46 of the box 174 that bear upon cover 172. Two clamps position laterally on centers of staggered joints 164, one compresses joints of bus bars A-B' and C-A' with the other compressing joints of bus bars B-C' and N-N'.

Figure 8:
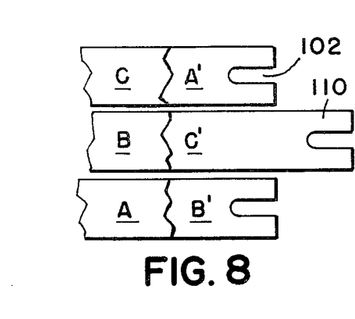
FIG. 8 is an identification plan view of three-phase bus bar joining end.
Figure 9:
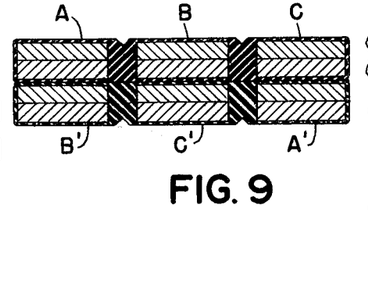
FIG. 9 is an identification section of a three-phase paired-phase bus bar joining end.
Figure 10:
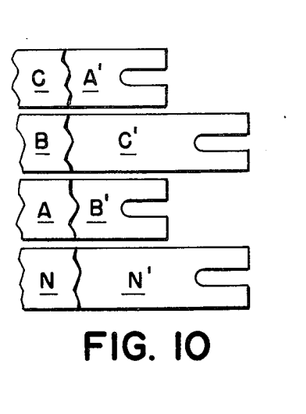
FIG. 10 is an identification plan view of a three-phase four-wire bus bar circuit joining end.
Figure 11:
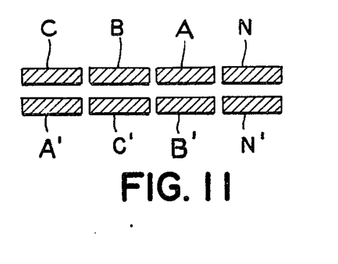
FIG. 11 is an identification of three-phase four-wire bus bar circuit end.

The bus tray system circuits include optionally three bus bars connected in tandem as shown in FIGS. 8 and 9 or four bus bars connected in tandem as shown in FIGS. 10 and 11.

FIG. 9 shows a typical cross section of a plurality of conductors as a flat cable encasing the bus bars within one homogeneous insulating jacket. Circuit cables of this design are more economical to produce, field assemble and join. Several multiple conductor cables may be stacked within a single enclosure, with each conductor connected selectively into one or more circuits and benefiting from heat transfer of direct contact with the enclosure. FIG. 9 represents two flat three-conductor cables, each conductor having two strips with these conductors connected by pairs to a three-phase 60-cycle power source in opposite phase relationship, A-B′, B-C′ and C-A′. Obviously, many other conductor arrangements, suitable as high current circuits of various sources and utility of electric power may be made.

Figure 12:
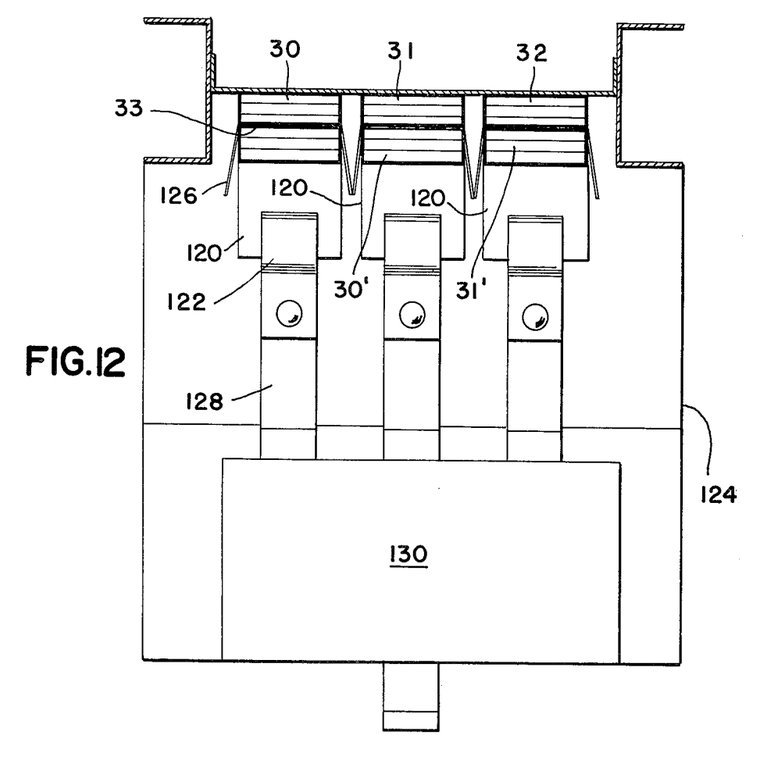
FIG. 12 is a transverse section of the bus bar's protrusion at a branch connection.
Figure 13:
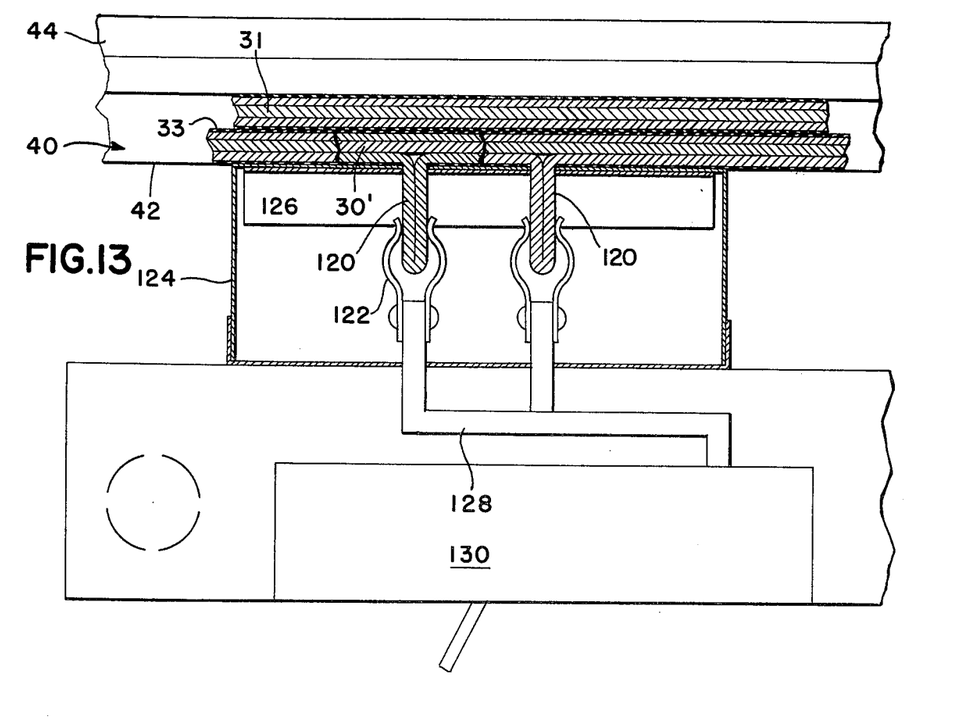
FIG. 13 is a longitudinal section of the branch connection of the bus bar.

At points of branch connection, one or more laminates of bus bars of which a conductor is made folds back as shown at 120 and is at that point deprived of insulation. These lapover points receive connector clamps 122 in a box 124 protected by insulation 126 and connected to leads 128 of the branch circuit. The leads run to a circuit breaker 130.

While I prefer to make the conductors rectangular, it will be understood that other shapes may be employed in bus tray.

While I prefer to have the covers of the tray released by the clamps to completely free to provide clear access for conductor assembly, it is readily apparent that advantages of installation may be obtained by supplementing the cover clamps with a hinge to integrate the tray and cover into one unit.

In view of my invention, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. An electrical distribution setup comprising a channel member having a cross-section in the form of a U with flanges at the ends of the legs of the U which flanges extend outwardly away from each other, groups of flat bus bars with their flat sides resting against each other within insulation surrounding each group, the groups resting in the channel member with the flat sides of each group parallel to the base of the U, a cover having a U-shaped cross-section resting within the channel member on top of the bus bars with the legs of its U extending in the same direction as the legs of the U of the channel member, a clamping member made up of two relatively movable parts, each part having an end which in clamping position extends around and embraces the end edge of a different one of the channel flanges, the clamping member parts overlapping each other away from the abovementioned ends in the direction toward the respective other ends and having mating holes within the portions that overlap, the particular clamping member part which is nearer the bus bars in its overlapping portion having a captive nut fixed to it and mating with the holes, a bridge having a base on top of the cover and extending from there on one side of the clamping member over top of the clamping member and back to its base on the other side of the clamping member and having a hole mating with the holes in the parts of the clamping member when in clamping position and with the captive nut, and a single bolt which in clamping position of the clamping member extends down through the above holes and the captive nut and thus with the aid of the clamping member presses the base of the bridge down upon the cover, there being only the one bolt of any kind associated with the one clamping member and bridge.

2. In a conduit for electrical conductors, a tray extending for a substantial length and having a bottom and two opposite sides running longitudinally, which tray has flanges which are on opposite top edges of the sides and extended out away from each other, a cover for the tray assembled to the tray in a position to cover the open top of the tray and movable inwardly and outwardly relative to the tray interior, means to hold the cover in the tray which means includes clamps attached at intervals along the cover on the side of the cover away from the tray bottom, the clamps extending across the tray and clamping across the tray and in this connection utilizing clamp ends going around the flange edges, the means to hold the cover in the tray including bolts associated with the clamps for moving the cover into the tray, there being in the means to hold the cover in the tray only a single bolt in any respect per clamp.

3. In a conduit for electrical conductors, a tray extending for a substantial length and having side walls with flanges at their tops extending outwardly away from the center of the tray, a cover for the tray assembled to the tray in position within the tray and movable inwardly and outwardly relative to the interior of the tray, clamps attached at spaced intervals to the cover on the side away from the bottom of the tray, the clamps having ends adapted to extend around the far edges of the flanges and the clamps extending across the tray and in one position clamping across the tray, having a fixed side of each clamp, channels bridging each clamp having bases, and connected to the cover at both sides of each clamp, bolts extending from the base of each channel through each clamp, and captive nuts on each clamp responding to the bolts and captive with respect to the fixed side of each clamp.

4. In a conduit for electrical conductors, a plurality of adjoiningly located trays for receiving the conductors which trays have side walls and flanges extending outwardly from the tops of the side walls, a plurality of adjoiningly located covers for the trays attached to the trays and movable inwardly and outwardly relative to the interior of the trays, the position of the adjoiningly located trays and the position of the adjoiningly located covers being in each case longitudinal of each other and the place where they adjoin being denominated the joint, clamps attached to the covers at spaced intervals, and a separate clamp, which clamp includes ends bending around the far edges of the flanges, the separate clamp having a pressure plate bridging the tray and cover joint to provide means for applying pressure to the joined covers and closing the joint gap.

5. In an electrical conduit, a tray extending for a substantial length and having side walls including flanges extending out, insulated bus bars side by side lying in the tray, a cover for the tray assembled to the tray in a position above the bus bars and movable inwardly and outwardly relative to the interior of the tray, clamps each consisting of a fixed clamp and a movable clamp and located to that side of the cover which is away from the bottom of the tray, and spaced along the cover, the fixed clamp and the movable clamp each having an end extending around to embrace the outside edge of a different one of the flanges and each in one position clamping the sides of the tray, and means for tightening the cover down on the bus bars in the tray and at the same time tightening the clamps, all by manipulating a single bolt at each clamp.

6. In an electrical conduit, a tray extending for a substantial length and having side walls including flanges extending out, insulated electrical bus bars lying side by side within the tray, a cover for the tray assembled to the tray in a position extending for the length of the tray and movable inwardly and outwardly relative to the interior of the tray, clamps at intervals along the cover located to the side of the cover which is away from the bottom of the tray, the clamps having ends adapted to embrace the outside edges of the flanges and extending across the tray and in one position engaging the two sides of the tray at the flanges by means of those ends, channels, one for each clamp, bridging each clamp from the cover and having in each case a base, bolts, one for each clamp, extending in each case through the base of the channel and through both sides of each clamp, captive nuts, one for each clamp, threaded on each bolt and secured to the fixed side of each clamp, the clamps when closed extending across the tray and clamping the tray and also through each channel pressing the cover with respect to the tray.

7. In a bus tray electrical distribution system, a bus tray extending a substantial length and having side walls with flanges extending out, flat insulated rigid and flexible bus bars side by side lying in the bus tray, a cover assembled with the bus tray to be located on top of the bus bars and be coextensive with the bus tray, means for holding the cover on and compressing the cover and bus bars into the trays including clamps having clamp ends extending around the outside edges of the flanges and including also only a single bolt per clamp.

* * * * *